US010575363B2

(12) United States Patent
Bergquist et al.

(10) Patent No.: US 10,575,363 B2
(45) Date of Patent: Feb. 25, 2020

(54) SIGNALING REDUCTION FOR OUT-OF-SYNC USERS

(71) Applicant: Telefonaktiebolaget LM Ericsson (publ), Stockholm (SE)

(72) Inventors: Gunnar Bergquist, Kista (SE); Ahmed Nouah, Ottawa (CA); Akram Bin Sediq, Kanata (CA); Patrick Lie Chin Cheong, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/067,074

(22) PCT Filed: Jan. 5, 2017

(86) PCT No.: PCT/IB2017/050041
§ 371 (c)(1),
(2) Date: Jun. 28, 2018

(87) PCT Pub. No.: WO2017/118934
PCT Pub. Date: Jul. 13, 2017

(65) Prior Publication Data
US 2019/0007993 A1 Jan. 3, 2019

Related U.S. Application Data

(60) Provisional application No. 62/276,086, filed on Jan. 7, 2016.

(51) Int. Cl.
*H04W 76/27* (2018.01)
*H04W 76/36* (2018.01)
(Continued)

(52) U.S. Cl.
CPC ............ *H04W 76/27* (2018.02); *H04W 76/30* (2018.02); *H04W 76/36* (2018.02); *H04W 92/10* (2013.01)

(58) Field of Classification Search
None
See application file for complete search history.

(56) References Cited

U.S. PATENT DOCUMENTS

| 10,178,703 | B2 * | 1/2019 | Abdel-Samad | H04W 74/004 |
| 2014/0269637 | A1 * | 9/2014 | Banister | H04L 5/0078 370/336 |

(Continued)

OTHER PUBLICATIONS

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.7.0, 3GPP Organizational Partners, Sep. 2015, 453 pages.

(Continued)

*Primary Examiner* — Kevin D Mew
(74) *Attorney, Agent, or Firm* — Sage Patent Group

(57) ABSTRACT

Systems and methods relating to an unacknowledged connection release in a cellular communications network are disclosed. In some embodiments, a method of operation of a base station in a cellular communications network comprises sending a connection release message to a wireless device that is in an Out-of-Sync (OOS) state and releasing a connection with the wireless device without receiving, from the wireless device, an acknowledgement of receipt of the connection release message. In this manner, signaling overhead for releasing the connection of the wireless device that is in OOS state is substantially reduced.

26 Claims, 12 Drawing Sheets

(51) Int. Cl.
*H04W 76/30* (2018.01)
*H04W 92/10* (2009.01)

(56) References Cited

U.S. PATENT DOCUMENTS

| | | | |
|---|---|---|---|
| 2014/0334389 A1 | 11/2014 | Abdel-Samad et al. | |
| 2015/0085762 A1* | 3/2015 | Matin | H04W 24/02 |
| | | | 370/329 |
| 2015/0099511 A1* | 4/2015 | Lindoff | H04W 24/08 |
| | | | 455/426.1 |
| 2016/0119896 A1* | 4/2016 | Jujaray | H04W 76/38 |
| | | | 455/458 |
| 2017/0064771 A1* | 3/2017 | Manepalli | H04L 1/1829 |
| 2017/0332435 A1* | 11/2017 | Tenny | H04W 28/065 |
| 2019/0053135 A1* | 2/2019 | Hahn | H04W 76/11 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.0.0, 3GPP Organizational Partners, Dec. 2015, 507 pages.

International Search Report and Written Opinion for International Patent Application No. PCT/IB2017/050041, dated Apr. 12, 2017, 16 pages.

International Preliminary Report on Patentability for International Patent Application No. PCT/IB2017/050041, dated Jan. 11, 2018, 20 pages.

* cited by examiner

SIGNALING REDUCTION FOR OUT-OF-SYNC USERS

RELATED APPLICATIONS

This application is a 35 U.S.C. § 371 national phase filing of International Application No. PCT/IB2017/050041, filed Jan. 5, 2017, which claims the benefit of Provisional Application No 62/276,086, filed Jan. 7, 2016, the disclosures of which are hereby incorporated herein by reference in their entireties.

TECHNICAL FIELD

The present disclosure relates to a connection release procedure for Out-of-Sync (OOS) wireless devices in a cellular communications network and, in particular, to an unacknowledged connection release procedure for OOS wireless devices that results in reduced signaling.

BACKGROUND

For the sake of presentation, the technical background is explained with respect to cellular networks that are implemented based on Long Term Evolution (LTE) and LTE-Advanced standards. Nevertheless, the present disclosure is applicable to general cellular networks where signaling reduction is desired during the release process of a wireless device, which is referred to as a User Equipment device (UE) in LTE.

Radio Resource Control (RRC) Connection Release

In LTE, the connection between the UE and the base station, referred to as an enhanced or evolved Node B (eNB) in LTE, is established and released through Layer 3 (L3), which is the RRC layer. The UE can be in either one of two states: RRC idle or RRC connected. When in RRC idle state, the UE is not connected to any eNB in the network; however, the UE may still be known to the network within a geographical area, called a tracking area, if the UE is registered in the network. While the UE is in idle state and registered in the network, the UE is required to monitor only paging channels, so it stays reachable by the network. On the other hand, when in RRC connected state, a connection between an eNB and a UE is established. As the UE enters the RRC connected state, the eNB allocates various types of computational and radio resources to facilitate the eNB-UE data exchange. While in RRC connected state, the UE is required to monitor the Physical Downlink Control Channel (PDCCH) candidates or enhanced PDCCH (EPDCCH) candidates that may be assigned to it.

In some scenarios, it is beneficial to perform RRC connection release, which is the process of moving the UE from RRC connected state to RRC idle state. For instance, when the UE is not active for a sufficiently long time, RRC connection release is beneficial as it recovers the underutilized resources at the eNB and saves battery at the UE side as the UE is only required to monitor paging channels in RRC idle state. To perform RRC connection release, the RRC layer at the eNB is required to send to the UE the following message: RRCConnectionRelease. In addition to releasing the UE, the RRCConnectionRelease message may also serve other purposes such as release with redirection and providing idle mode mobility information (see Third Generation Partnership Project (3GPP) Technical Specification (TS) 36.331 V12.7.0 for more details).

Acknowledgement of Receiving RRCConnectionRelease

According to the LTE protocol stack for the control plane shown in FIG. 1, any RRC message, including the RRCConnectionRelease message, is pushed to the lower layer (L2). To ensure the successful reception of the RRCConnectionRelease message at the UE side, the following two functionalities are used at the Radio Link Control (RLC) sub-layer and the Medium Access Control (MAC) sub-layer:

1. RLC Acknowledged Mode (AM): The RRCConnectionRelease message uses the RLC AM protocol, where the RLC at the eNB expects an RLC Acknowledgment (ACK) to be sent from the RLC at the UE side, confirming the successful reception of the RLC payload. In the absence of an RLC ACK, the RLC will retransmit the RLC payload.
2. Hybrid Automatic Repeat Request (HARQ): MAC employs HARQ, where the MAC at the eNB expects a HARQ ACK to be sent from the MAC layer at the UE side, confirming the successful reception of the MAC payload. In the absence of HARQ ACK, the MAC layer will re-transmit the MAC payload.

Uplink Synchronization

Since the UEs are located at different distances from the eNB, the uplink transmissions from the UE will experience different propagation delays. To compensate for the different propagation delays, the eNB continuously monitors the arrival time of uplink transmission from each UE and sends a Time Alignment Command (TAC) which instructs the UE to advance or delay its uplink transmission, such that all uplink transmissions from all UEs arrive in a manner that is synchronous to the uplink transmission time intervals. In other words, a TAC makes the UE In-Sync (INS) with the eNB. An absence of TAC for a configurable Time-Alignment-Timer (TAT) causes the UE to be declared Out-of-Sync (OOS). When the UE transitions from INS state to OOS state, all its uplink resources, including the Physical Uplink Control Channel (PUCCH) Scheduling Request (SR) and Sounding Reference Signal (SRS) resource, are revoked. This is the case because the UE is not allowed to transmit anything in the uplink while it is in OOS state. If the UE is in OOS state and requires transmitting in the uplink, the UE will need to re-sync first through the Random Access Channel (RACH) procedure. Similarly, if the eNB requires transmitting in the downlink to an OOS UE, the eNB will send a PDCCH order, which will request the UE to resynchronize by starting the RACH process.

When the UE is in the OOS state, in order for it to send an RLC ACK and a HARQ ACK for the RRCConnectionRelease message, it will require a significant amount of radio resources from the eNB side which can have a negative impact on the network, e.g., cell capacity, especially in loaded scenarios. In addition, it will result in more power consumption from the UE side. Moreover, it will incur higher latency in releasing the UE. FIG. 2 illustrates a timing diagram depicting the RRC connection release process when the UE is in the OOS state. The process proceeds in the following steps 1-10 shown in FIG. 2 as follows:

step 1. The TAT expires and the UE is declared OOS.

step 2. The eNB decides to release the RRC connection, which could be due to inactivity of the UE or any other purpose. The RRC layer prepares the RRCConnectionRelease message.

step 3. The eNB sends a PDCCH order to the UE so the UE can resynchronize by initiating the RACH procedure.

step 4. The UE answers the PDCCH order by initiating the RACH procedure, which can be a Contention-Based Random Access (CBRA) or Contention-Free Random Access (CFRA) procedure:

step 4a. The UE sends the RACH preamble in the Physical Random Access Channel (PRACH).

step 4b. The eNB answers the UE preamble with a Random Access Response (RAR). The RAR contains an uplink grant that can be used by the UE to send MSG3. The RAR is sent in the Physical Downlink Shared Channel (PDSCH).

step 4c. The UE sends MSG3 to the eNB in the Physical Uplink Shared Channel (PUSCH). In case of CBRA, the UE has to include its Cell Radio Network Temporary Identifier (C-RNTI).

step 4d. The eNB acknowledges the reception of MSG3 by sending a HARQ ACK to the UE in the Physical HARQ Indicator Channel (PHICH).

step 4e. The eNB sends a Contention Resolution (CR) message to the UE in case of CBRA.

step 5. If the RACH is successful, the eNB sends the RRCConnection Release message.

step 6. The UE sends a HARQ ACK for the MAC payload that carried the RRCConnectionRelease message in the PUCCH.

step 7. The UE prepares an RLC ACK for the RLC payload that carried the RRCConnectionRelease message. It also prepares the internal actions upon reception of the RRCConnectionRelease message. RACH procedure a second time and it has to be a CBRA procedure:

step 8a. The UE sends the RACH preamble in PRACH.

step 8b. The eNB answers the UE preamble by sending a RAR in PDSCH. The RAR contains an uplink grant that can be used by the UE to send MSG3.

step 8c. The UE sends MSG3 to the eNB which contains the UE's C-RNTI. If the uplink grant that the UE received in the RAR is large enough, the UE can also send an RLC ACK prepared in step 7.

step 8d. The eNB acknowledges the reception of MSG3 by sending a HARQ ACK to the UE PHICH.

step 8e. The eNB sends a CR message to the UE which can contain an uplink grant that the UE may also use to send an RLC ACK if not sent already in step 8c. step 9. If the UE did not manage to send the RLC ACK during the RACH procedure, then:

step 9a. The UE uses an uplink grant to send the RLC ACK. The uplink grant can be obtained from the eNB by sending an SR to the eNB, where the SR resource is configured through sending an RRC Reconfiguration message from the eNB to the UE, after a successful RACH procedure.

step 9b. Releases the RRC connection.

step 10. The eNB releases the UE upon the reception of the RLC ACK.

Thus, when using conventional connection release mechanisms for a OOS UE, there is a significant amount of signaling overhead. This signaling causes unnecessary usage of UE battery power for the transmission and reception of the signaling overhead. As such, there is a need for systems and methods for releasing a connection with an OOS UE that addresses the aforementioned problems with the conventional procedure.

SUMMARY

Systems and methods relating to an unacknowledged connection release in a cellular communications network are disclosed. In some embodiments, a method of operation of a base station in a cellular communications network comprises sending a connection release message to a wireless device that is in an Out-of-Sync (OOS) state and releasing a connection with the wireless device without receiving, from the wireless device, an acknowledgement of receipt of the connection release message. In this manner, signaling overhead for releasing the connection of the wireless device that is in OOS state is substantially reduced.

In some embodiments, releasing the connection with the wireless device comprises releasing the connection with the wireless device without receiving, from the wireless device, a Hybrid Automatic Repeat Request (HARQ) acknowledgement and without receiving a Radio Link Control (RLC) acknowledgement.

In some embodiments, the method further comprises re-transmitting the connection release message to the wireless device without waiting for a HARQ acknowledgement. Further, in some embodiments, re-transmitting the connection release message comprises re-transmitting the connection release message a configurable number of times.

In some embodiments, the method further comprises, prior to sending the connection release message, making an agreement with the wireless device to activate unacknowledged connection release. Further, in some embodiments, the agreement is an implicit agreement to activate unacknowledged connection release. In other embodiments, making the agreement with the wireless device to activate unacknowledged connection release comprises receiving capability information from the wireless device that indicates that the wireless device supports unacknowledged connection release and making a decision to activate unacknowledged connection release for the wireless device based on the capability information.

In some other embodiments, making the agreement comprises receiving an indication from the wireless device to activate unacknowledged connection release. Further, in some embodiments, making the agreement further comprises sending a response to the wireless device that indicates that the base station accepts activation of unacknowledged connection release. Further, in some embodiments, receiving the indication from the wireless device to activate unacknowledged connection release comprises receiving the indication from the wireless device to activate unacknowledged connection release via a Medium Access Control (MAC) control element, and sending the response to the wireless device comprises sending the response via a MAC control element.

In some other embodiments, making the agreement comprises sending, to the wireless device, an indication to activate unacknowledged connection release. Further, in some embodiments, making the agreement further comprises receiving, from the wireless device, a response that accepts activation of unacknowledged connection release. Further, in some embodiments, sending the indication comprises sending the indication to the wireless device via a MAC control element, and receiving the response comprises receiving the response from the wireless device via a MAC control element.

Embodiments of a base station for operation in a cellular communications network are also disclosed. In some embodiments, a base station for operation in a cellular communications network is adapted to send a connection release message to a wireless device that is in an OOS state and release a connection with the wireless device without receiving, from the wireless device, an acknowledgement of receipt of the connection release message. Further, in some embodiments, the base station is further adapted to perform the method of operation of the base station according to any one of the embodiments disclosed herein.

In some embodiments, a base station for operation in a cellular communications network comprises means for sending a connection release message to a wireless device that is in an OOS state and means for releasing a connection with the wireless device without receiving, from the wireless device, an acknowledgement of receipt of the connection release message.

In some embodiments, a base station for operation in a cellular communications network comprises a sending module operable to send a connection release message to a wireless device that is in an OOS state and a connection releasing module operable to release a connection with the wireless device without receiving, from the wireless device, an acknowledgement of receipt of the connection release message.

In some embodiments, a base station for operation in a cellular communications network comprises at least one transceiver, at least one processor, and memory comprising instructions executable by the at least one processor whereby the base station is operable to send, via the at least one transceiver, a connection release message to a wireless device that is in an OOS state and release a connection with the wireless device without receiving, from the wireless device, an acknowledgement of receipt of the connection release message.

Embodiments of a method of operation of a wireless device in a cellular communications network are also disclosed. In some embodiments, a method of operation of a wireless device in a cellular communications network comprises receiving a connection release message from a base station while the wireless device is in an OOS state and releasing a connection with the base station without sending an acknowledgement to the base station. In this manner, signaling overhead for releasing the connection of the wireless device when in the OOS state is substantially reduced.

In some embodiments, releasing the connection with the base station comprises releasing the connection with the base station without receiving, from the base station, a HARQ acknowledgement and without receiving a RLC acknowledgement.

In some embodiments, the method further comprises, prior to receiving the connection release message, making an agreement with the base station to activate unacknowledged connection release. In some embodiments, the agreement is an implicit agreement to activate unacknowledged connection release. In some other embodiments, making the agreement with the base station to activate unacknowledged connection release comprises sending capability information to the base station that indicates that the wireless device supports unacknowledged connection release and receiving an indication from the base station to activate unacknowledged connection release.

In some other embodiments, making the agreement comprises sending an indication to the base station to activate unacknowledged connection release. Further, in some embodiments, making the agreement further comprises receiving a response from the base station that indicates that the base station accepts activation of unacknowledged connection release. Further, in some embodiments, sending the indication to the base station to activate unacknowledged connection release comprises sending the indication to the base station to activate unacknowledged connection release via a MAC control element and receiving the response from the base station comprises receiving the response via a MAC control element.

In some other embodiments, making the agreement comprises receiving, from the base station, an indication to activate unacknowledged connection release. Further, in some embodiments, making the agreement further comprises sending, to the base station, a response that accepts activation of unacknowledged connection release. Further, in some embodiments, receiving the indication comprises receiving the indication from the base station via a MAC control element and sending the response comprises sending the response to the base station via a MAC control element.

Embodiments of a wireless device for operation in a cellular communications network are also disclosed. In some embodiments, a wireless device for operation in a cellular communications network is adapted to receive a connection release message from a base station while the wireless device is in an OOS state and release a connection with the base station without sending an acknowledgement to the base station. In some embodiments, the wireless device is further adapted to perform the method of operation of a wireless device according to any one of the embodiments disclosed herein.

In some embodiments, a wireless device for operation in a cellular communications network comprises means for receiving a connection release message from a base station while the wireless device is in an OOS state and means for releasing a connection with the base station without sending an acknowledgement to the base station.

In some embodiments, a wireless device for operation in a cellular communications network comprises a receiving module operable to receive a connection release message from a base station while the wireless device is in an OOS state and a connection releasing module operable to release a connection with the base station without sending an acknowledgement to the base station.

In some embodiments, a wireless device for operation in a cellular communications network comprises at least one transceiver, at least one processor, and memory comprising instructions executable by the at least one processor whereby the wireless device is operable to receive a connection release message from a base station while the wireless device is in an OOS state and release a connection with the base station without sending an acknowledgement to the base station.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
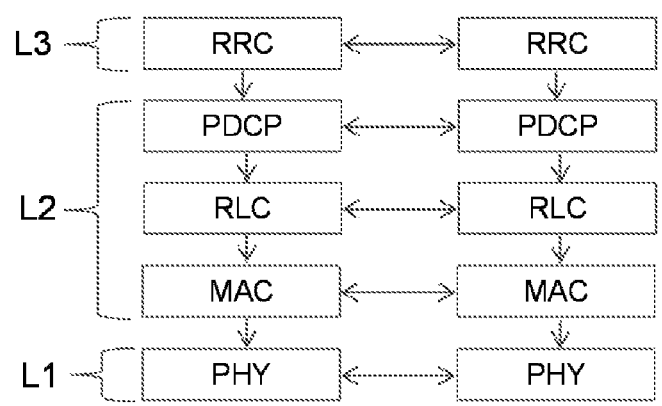
FIG. 1 illustrates the User Equipment device (UE)—enhanced or evolved Node B (eNB) control plane.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

The present disclosure pertains to the implementation of general cellular networks and in particular to those networks that are based on Long Term Evolution (LTE) and LTE-Advanced standards defined by Third Generation Partnerships Project (3GPP). The present disclosure can be implemented in L1/L2/L3 in both a base station (i.e., an enhanced or evolved Node B (eNB)) and a User Equipment device (UE). Nevertheless, the embodiments described herein are not limited to LTE (LTE or LTE-Advanced); rather, the embodiments described herein are generally applicable to any type of cellular network where signaling reduction is desired during the release process of an Out-of-Sync (OOS) wireless device, which is referred to as a UE in LTE. Such a signaling reduction would result in a reduction in unnecessary usage of UE battery power for transmission and reception of signaling overhead.

Systems and methods relating to an unacknowledged connection release for a UE in an OOS state are disclosed. In some embodiments, an eNB sends a connection release message to a UE that is in the OOS state. The eNB releases a connection with the UE without waiting for an Acknowledgement (ACK) from the UE (e.g., without receiving a Radio Link Control (RLC) ACK and without receiving a Hybrid Automatic Repeat Request (HARQ) ACK from the UE). At the UE, the UE receives the connection release from the eNB and releases the connection with the eNB without sending an ACK to the eNB (e.g., without sending an RLC ACK and without sending a HARQ ACK to the eNB). In this manner, signaling for connection release for a UE in the OOS state is significantly reduced.

In some embodiments, the eNB and the UE make an agreement to activate unacknowledged connection release. The agreement may be implicit or explicit.

In some embodiments, an eNB and the UE can establish a prior agreement that the RRCConnection Release message can be sent to the UE while in OOS state without requiring any ACK; thus, the connection release procedure described herein for a UE while in the OOS state is referred to as "unacknowledged RRC Connection Release." In some embodiments, the eNB may elect to re-transmit the RRC-Connection Release message for a configurable number of times at configurable durations to increase the robustness. In some embodiments, the robustness can be also improved by choosing the most robust Modulation and Coding Scheme (MCS) in Physical Downlink Shared Channel (PDSCH) and the maximum number of Control Channel Elements (CCEs) in Physical Downlink Control Channel (PDCCH) for transmitting the RRCConnectionRelease message.

By establishing the agreement that no ACK is required, the UE is not required to re-sync to complete the actions upon receiving the RRCConnectionRelease message. This brings savings in radio resources at the eNB as follows:

a. Avoid sending a PDCCH order: a PDCCH order is usually sent with eight CCEs.
 b. Avoid double Random Access Channel (RACH): in each RACH, the eNB is required to allocate resources to send the Random Access Response (RAR) in MSG2 and allocate Physical Uplink Shared Channel (PUSCH) resources for MSG3.
 c. Avoid allocating an uplink grant and the corresponding PUSCH resources for an RLC ACK.

The main savings from the UE side comes in battery savings as each RACH consumes high energy to transmit. Finally, without waiting for an ACK, the RRC connection release can complete in a shorter time at both the eNB and the UE.

Figure 3:
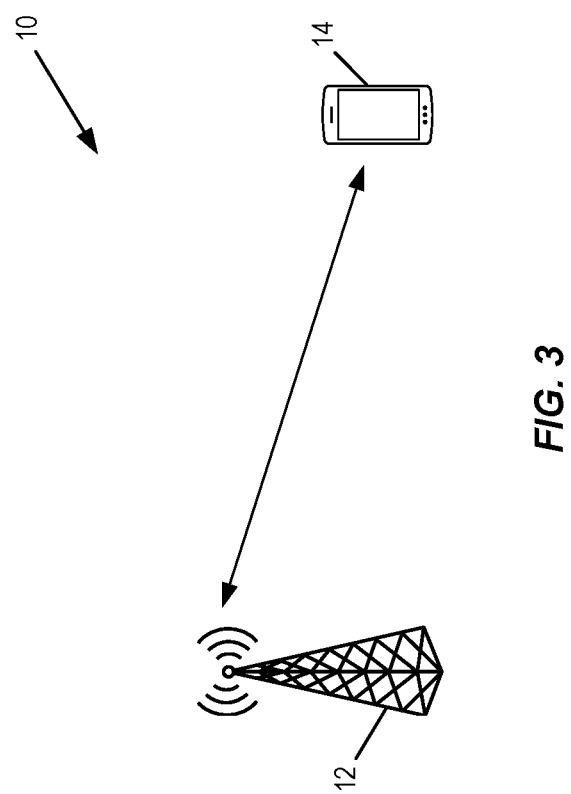
FIG. 3 illustrates one example of a cellular communications network in which an unacknowledged connection release is implemented according to some embodiments of the present disclosure.
Figure 4:
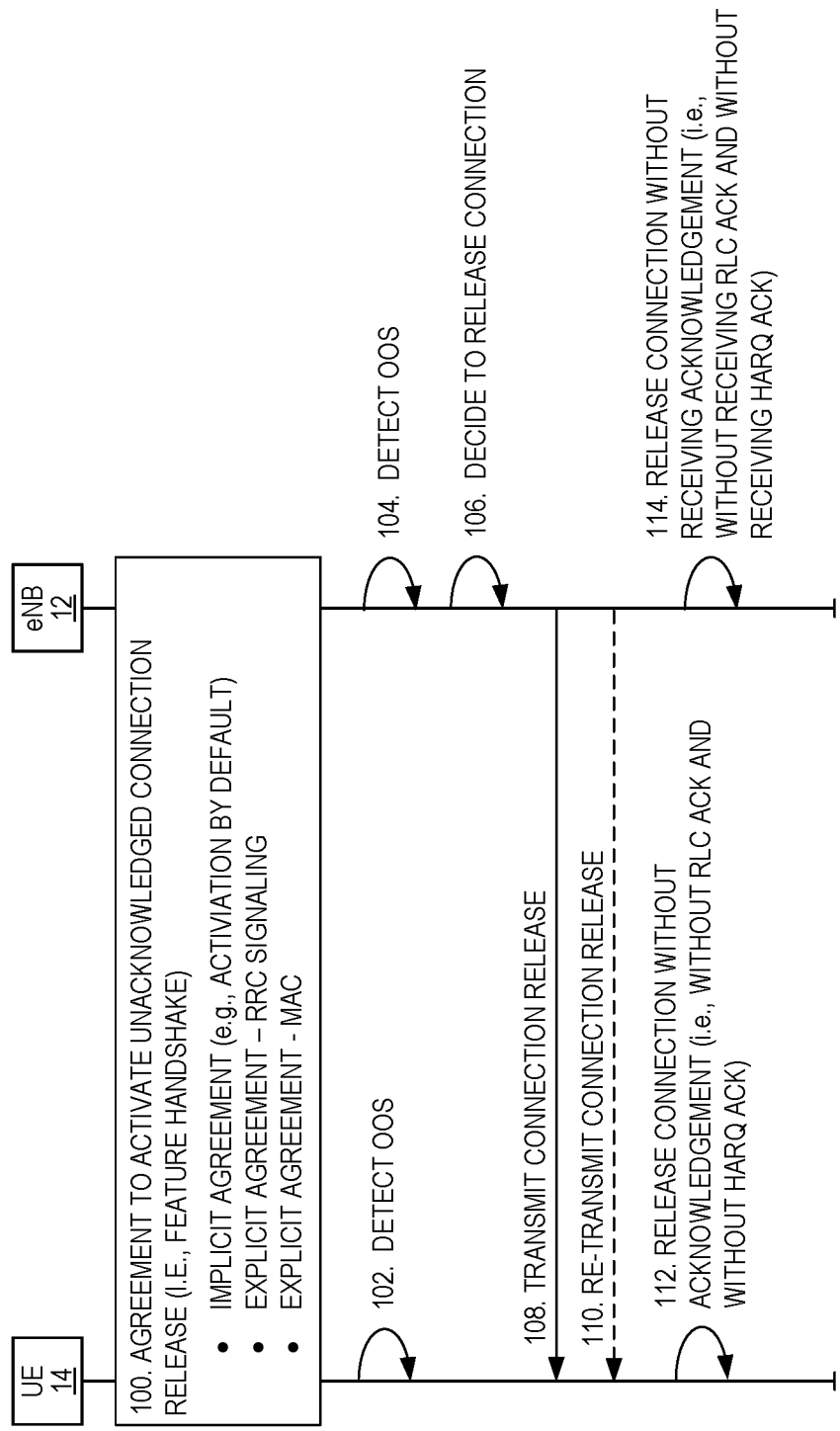
FIG. 4 illustrates the operation of the base station and the wireless device of FIG. 3 to perform an unacknowledged connection release while the wireless device is in an OOS state according to some embodiments of the present disclosure.

Embodiments of the present disclosure are implemented in a cellular communications network. As illustrated in FIG. 3, a cellular communications network 10 includes an eNB 12, which may more generally be referred to as a base station and even more generally as a radio access node, and a UE 14, which may more generally be referred to as a wireless device. As illustrated in FIG. 4, in operation, the eNB 12 and the UE 14 agree to activate unacknowledged connection release (step 100). This agreement is also referred to herein as a "feature handshake." The agreement may be implicit or explicit, as described below.

Figure 2:
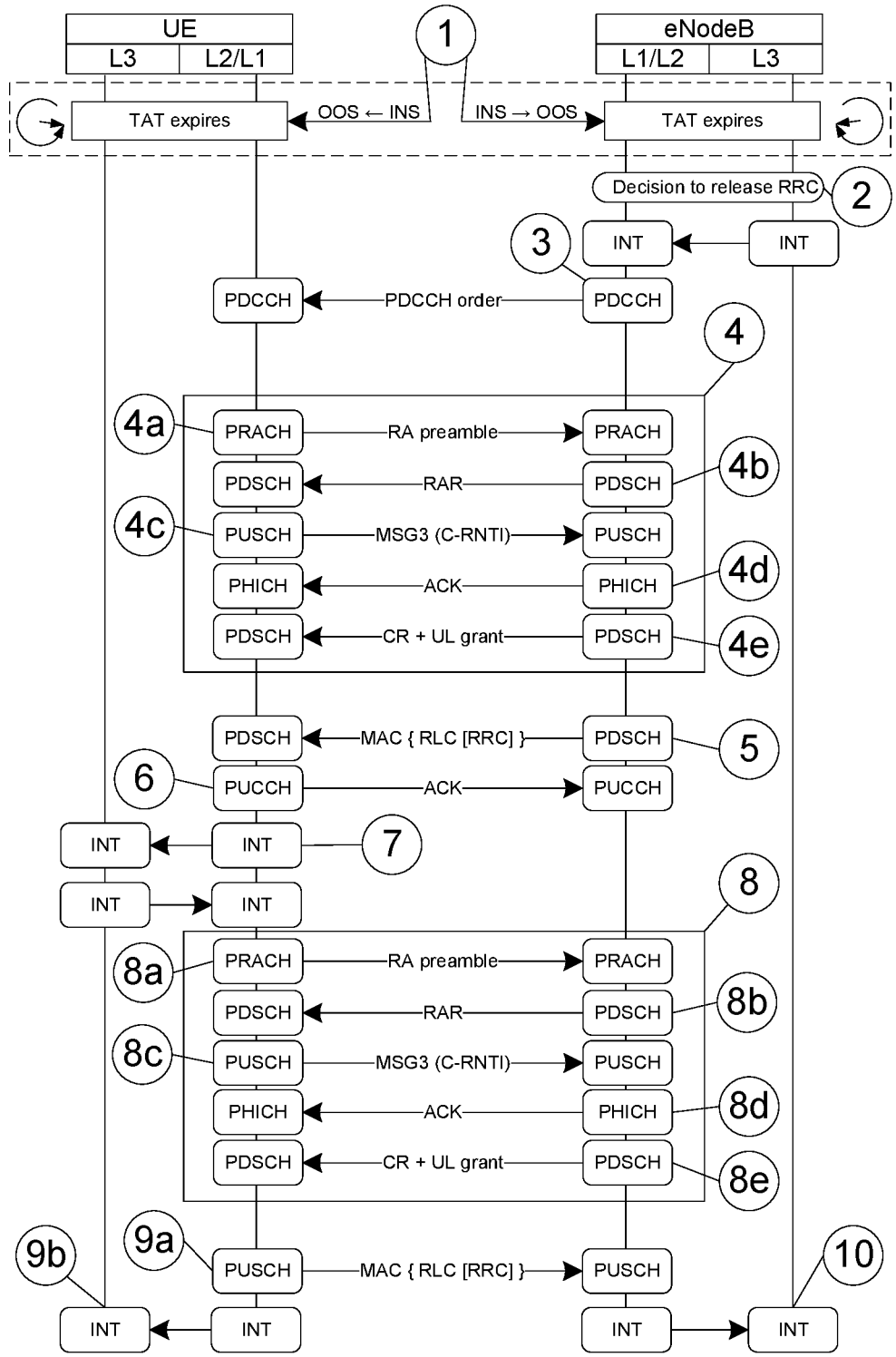
FIG. 2 illustrates the Radio Resource Control (RRC) connection release process when the UE is Out-of-Sync (OOS)

At some point, the UE 14 transitions to the OOS state, and the OOS state of the UE 14 is detected by the UE 14 and the eNB 12 (steps 102 and 104). For example, as discussed above, an absence of a Time Alignment Command (TAC) for a configurable Time-Alignment-Timer (TAT) causes the UE 14 to be declared OOS. The eNB 12 makes a decision to release the connection with the UE 14 (step 106). Conventionally, since the UE 14 is OOS, the procedure of FIG. 2 would need to be performed to release the connection. However, since the eNB 12 and the UE 14 have agreed to activate unacknowledged connection release, an unacknowledged connection release procedure is used. More specifically, the eNB 12 sends an RRCConnectionRelease message to the UE 14 (step 108). In some embodiments, the eNB 12 may re-transmit the RRCConnectionRelease message one or more additional times (step 110). For example, the eNB 12 may re-transmit the RRCConnectionRelease message for a configurable number of times, e.g., at configurable durations, e.g., to increase the robustness. This re-transmission is performed without receiving a HARQ acknowledgement (i.e., a Negative Acknowledgement (NACK)) from the UE 14. Note that while the number of re-transmissions may be configured using any suitable configuration technique, in some embodiments, the number of re-transmissions is configured during step 100 when making the agreement to use unacknowledged connection release.

Upon receiving the RRCConnectionRelease message, the UE 14 releases the connection without sending an ACK (i.e., without sending an RLC ACK and without sending a HARQ ACK) to the eNB 12 (step 112). In other words, the UE 14 releases the connection without sending an ACK to the eNB 12 to acknowledge receipt of the RRCConnectionRelease message. Similarly, the eNB 12 releases the connection without receiving an ACK (i.e., without receiving an RLC ACK and without receiving a HARQ ACK) from the UE 14 (step 114).

Figure 5:
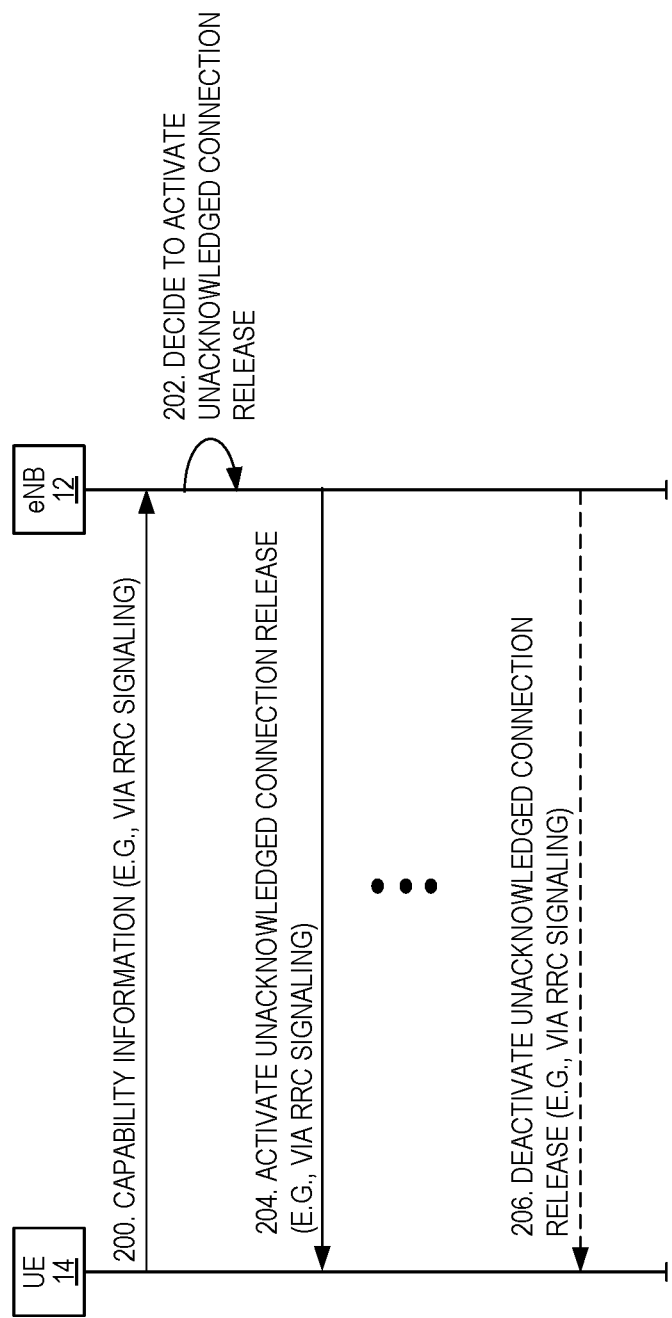
FIGS. 5 through 7 illustrate procedures by which the base station and the wireless device make an agreement to activate unacknowledged connection release according to some embodiments of the present disclosure.
Figure 6:
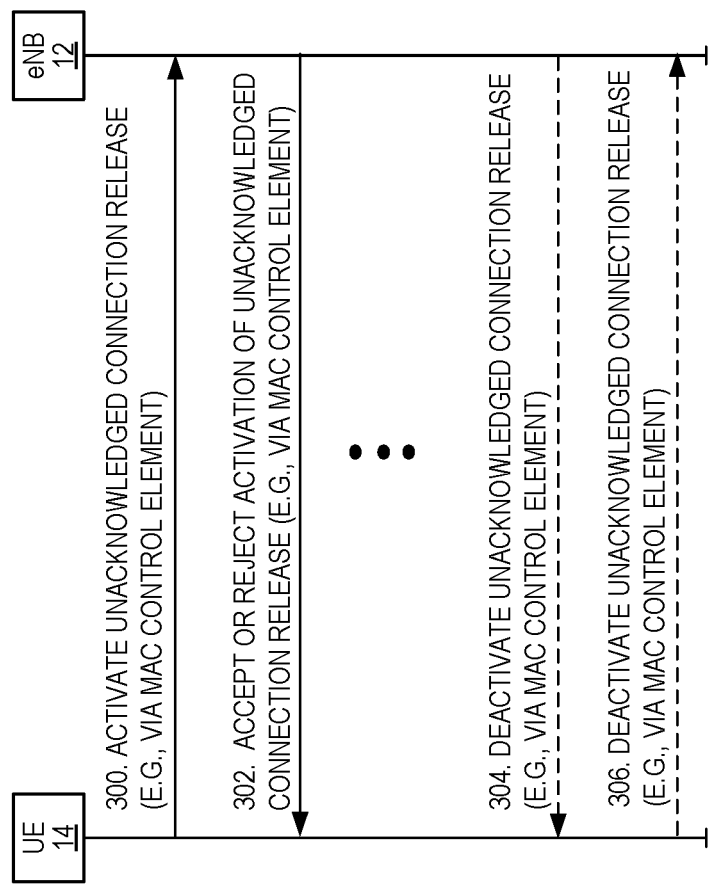
Figure 7:
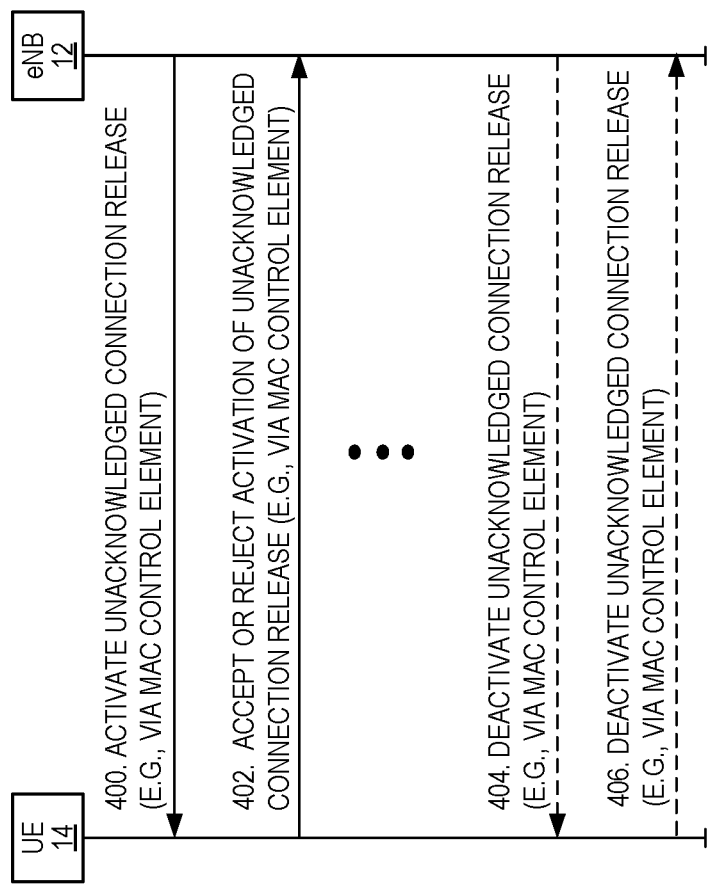

As discussed above with respect to step 100 of FIG. 4, the eNB 12 and the UE 14 establish an agreement on using an unacknowledged connection release (i.e., an unacknowledged RRC Connection Release). This can be done through one of the following procedures:

1. Implicit agreement: The eNB 12 and the UE 14 have a prior agreement on using this feature by default.
2. Explicit agreement: In relation to RRC connection establishment, the UE 14 exchanges its capability information with the eNB 12. In other words, the UE 14 provides its capability information to the eNB 12. The capability information of the UE 14 can include an indication of whether the UE 14 supports unacknowledged RRC connection release. If both the UE 14 and the eNB 12 support unacknowledged RRC connection release, the eNB 12 indicates to the UE 14, in the RRC Reconfiguration message, that the UE 14 is to activate unacknowledged RRC connection release. The eNB 12 may also elect to disable the feature by sending an RRC Reconfiguration message due to an internal or external event. One example of this process is illustrated in FIG. 5. As illustrated in FIG. 5, the UE 14 sends its capability information to the eNB 12 (e.g., via RRC signaling such as in an RRC message during RRC connection establishment) (step 200). If both the UE 14 and the eNB 12 support unacknowledged RRC connection release, the eNB 12 decides to activate unacknowledged RRC connection release (step 202) and sends, to the UE 14, an indication to activate unacknowledged RRC connection release (e.g., via RRC signaling such as an RRC Reconfiguration message) (step 204). Optionally, in some embodiments, the eNB 12 may thereafter decide to disable unacknowledged RRC connection release and, as such, send an indication to the UE 14 to deactivate, or disable, unacknowledged RRC connection release (e.g., via RRC signaling such as an RRC Reconfiguration message) (step 206).
3. Explicit agreement: using new Medium Access Control (MAC) control elements:
    a. As illustrated in FIG. 6, the UE 14 may send, to the eNB 12, a MAC control element to activate the unacknowledged RRC connection release (step 300). The eNB 12 responds with another MAC control element to either accept the UE request or reject it (step 302). That is, the eNB 12 responds with a MAC control element that indicates to the UE 14 whether the eNB 12 has accepted the request of the UE 14 to activate unacknowledged RRC connection release. The eNB 12 may not respond with another MAC control element and, in this case, the UE 14 will not activate the unacknowledged RRC connection release. In other words, in some embodiments, the UE 14 interprets no response from the eNB 12 as an (implicit) indication that the eNB 12 has not accepted the request of the UE 14 to activate unacknowledged RRC connection release. Optionally, in some embodiments, the eNB 12 or the UE 14 may subsequently elect to disable the feature by sending MAC control elements due to, e.g., an internal or external event (step 304 or step 306).
    b. As illustrated in FIG. 7, in another embodiment, the eNB 12 sends a MAC control element to the UE 14 to activate the unacknowledged RRC connection release (step 400). The UE 14 responds with another MAC control element to either accept the eNB request or reject it (step 402). That is, the UE 14 responds with a MAC control element that indicates to the eNB 12 whether the UE 14 has accepted the request of the eNB 12 to activate unacknowledged RRC connection release. The UE 14 may not respond with another MAC control element and, in this case, the eNB 12 will not activate the unacknowledged RRC connection release. In other words, in some embodiments, the eNB 12 interprets no response from the UE 14 as an (implicit) indication that the UE 14 has not accepted the request of the eNB 12 to activate unacknowledged RRC connection release. Optionally, in some embodiments, the eNB 12 or the UE 14 may elect to disable the feature by sending MAC control elements due to, e.g., an internal or external event (step 404 or step 406).

As described above with respect to steps 102 through 112 of FIG. 4, if agreed by both the eNB 12 and the UE 14, then RRC unacknowledged release takes effect when the UE 14 is in OOS state and the RRC connection of the UE 14 needs to be released, i.e., to move the UE 14 status from RRC connected state to RRC idle state. When RRC at the eNB 12 prepares the RRCConnectionRelease message, the RRCConnectionRelease message gets sent as in legacy LTE with the following exceptions:

MAC sub-layer avoids scheduling PDCCH order so RACH is avoided.
MAC sub-layer avoids waiting for a HARQ ACK.
RLC sub-layer avoids waiting for an RLC ACK.
The UE 14 releases itself silently upon the reception of RRCConnectionRelease without sending a HARQ ACK or an RLC ACK.
The eNB 12 may elect to re-transmit RRCConnectionRelease for a configurable number of times.

Figure 8:
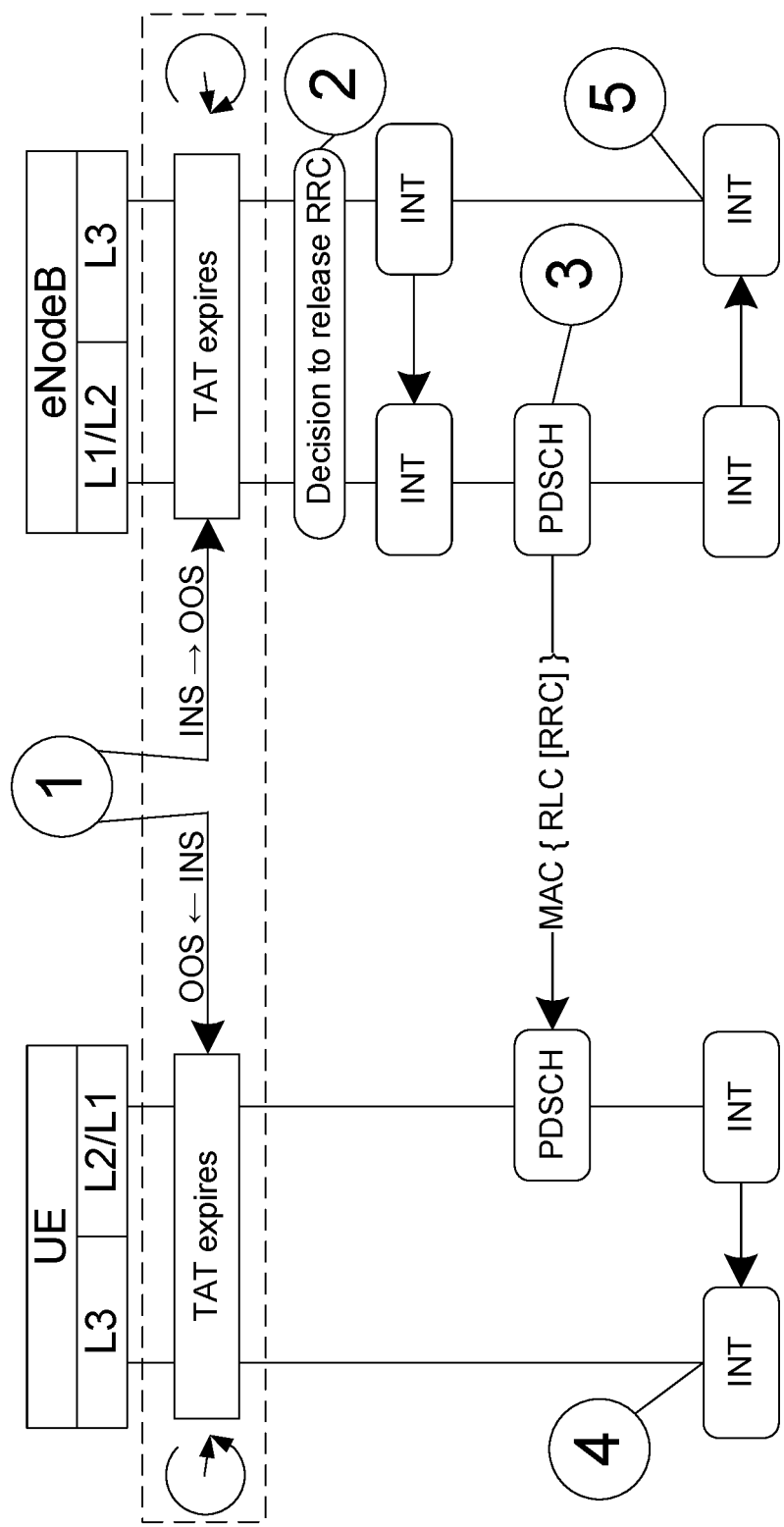
FIG. 8 illustrates the operation of the base station and the wireless device to execute an unacknowledged connection release according to some embodiments of the present disclosure.

The full sequence of unacknowledged RRC Connection Release according to some embodiments of the present disclosure is illustrated in FIG. 8. In other words, FIG. 8 illustrates steps 102 through 112 of FIG. 4 in more detail according to some embodiments of the present disclosure. As illustrated in FIG. 8, the steps 1-5 are as follows:
step 1. The TAT expires and the UE 14 is declared OOS.
step 2. The eNB 12 decides to release the RRC connection, which could be due to inactivity of the UE 14 or any other purpose. The RRC layer at the eNB 12 prepares the RRCConnectionRelease message.
step 3. The eNB 12 sends the RRCConnectionRelease message to the UE 14.

step 4. The UE 14 performs actions upon reception of RRCConnectionRelease and releases the RRC connection.

step 5. The eNB 12 releases the UE 14. In other words, the eNB 12 also releases the RRC connection.

In some embodiments, some important aspects are:

Establishing an agreement between the eNB 12 and the UE 14, either implicitly or explicitly, to send the RRCConnectionRelease to the UE 14 in OOS state without requiring any ACK.

Once agreed by the eNB 12 and the UE 14, an unacknowledged RRC release is achieved by modifying the LTE legacy procedure to have a special handling of RRC Connection Release when sent to the UE 14 that is in OOS state as follows:

eNB side:
 1. Avoid sending a PDCCH order from the eNB 12 to the UE 14.
 2. Avoid waiting for a HARQ ACK or an RLC ACK.
 3. Optionally re-transmit the RRCConnectionRelease for a configurable number of times.
 4. Release the RRC connection.

UE side:
 5. Avoid sending a HARQ ACK or an RLC ACK.
 6. Release the RRC connection.

Figure 9:
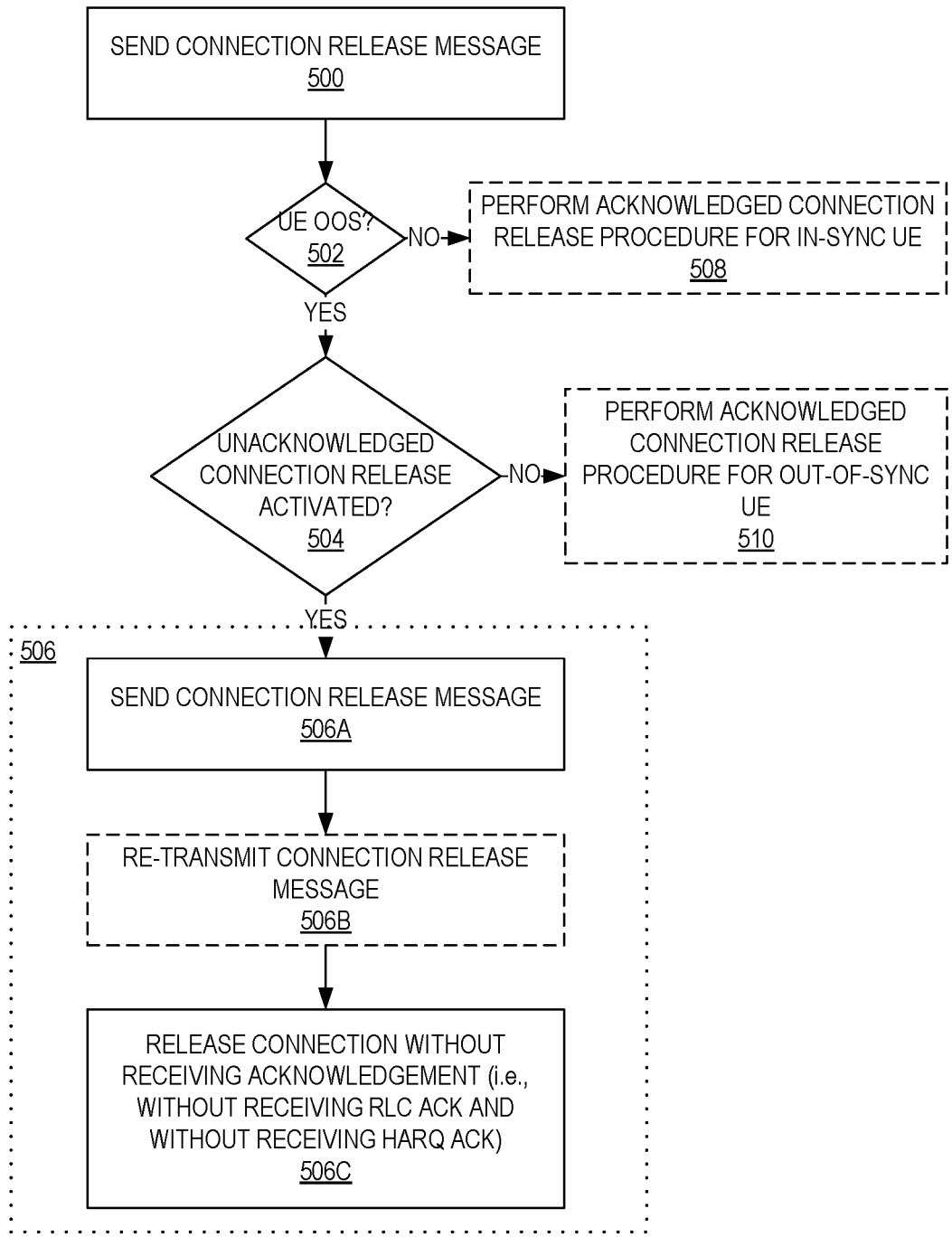
FIG. 9 is a flow chart that illustrates the operation of the base station according to some embodiments of the present disclosure.

FIG. 9 is a flow chart that illustrates the operation of the eNB 12 according to some embodiments of the present disclosure. The eNB 12 decides to release the connection with the UE 14 and, as such, sends an RRC connection release message to the UE 14 (step 500). If the UE 14 is in the OOS state (step 502; YES) and if agreement to activate unacknowledged RRC connection release has been made (step 504; YES), the eNB 12 performs an unacknowledged RRC connection release procedure (step 506). More specifically, as described above, the eNB 12 sends an RRC connection release message to the UE 14 (step 506A), optionally re-transmits the RRC connection release message (step 506B), and releases the UE 14 without receiving an ACK from the UE 14 (i.e., without receiving an RLC ACK and without receiving a HARQ ACK) (step 506C).

Optionally, if the UE 14 is In-Sync (INS) (step 502; NO), the eNB 12 performs, e.g., the conventional connection release procedure for an INS UE (step 508). The details of the conventional connection release procedure for an INS UE are well known and, as such, are not repeated herein. Optionally, if the UE 14 is in the OOS state but unacknowledged RRC connection release is not activated (step 504; NO), then the eNB 12 performs, e.g., the conventional connection release procedure for an OOS UE (e.g., the procedure of FIG. 2) (step 510).

Figure 10:
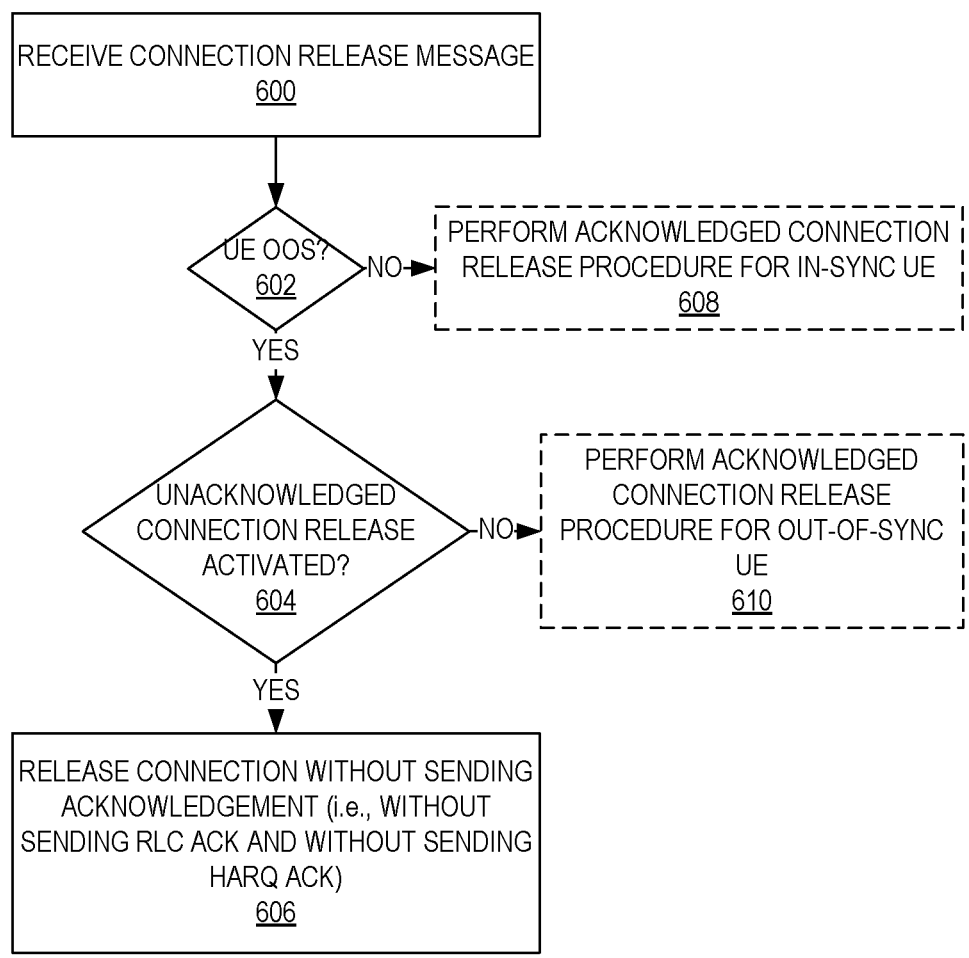
FIG. 10 is a flow chart that illustrates the operation of the wireless device according to some embodiments of the present disclosure.

FIG. 10 is a flow chart that illustrates the operation of the UE 14 according to some embodiments of the present disclosure. The UE 14 receives an RRC connection release message from the eNB 12 (step 600). If the UE 14 is in the OOS state (step 602; YES) and if agreement to activate unacknowledged RRC connection release has been made (step 604; YES), the UE 14 performs an unacknowledged RRC connection release procedure (step 606). In other words, the UE 14 releases the connection without sending an ACK to the eNB 12 (i.e., without sending an RLC ACK and without sending a HARQ ACK).

Optionally, if the UE 14 is INS (step 602; NO), the UE 14 performs, e.g., the conventional connection release procedure for an INS UE (step 608). Again, the details of the conventional connection release procedure for an INS UE are well-known and, as such, are not repeated herein. Optionally, if the UE 14 is in the OOS state but unacknowledged RRC connection release is not activated (step 604; NO), then the UE 14 performs, e.g., the conventional connection release procedure for an OOS UE (e.g., the procedure of FIG. 2) (step 610).

Figure 11:
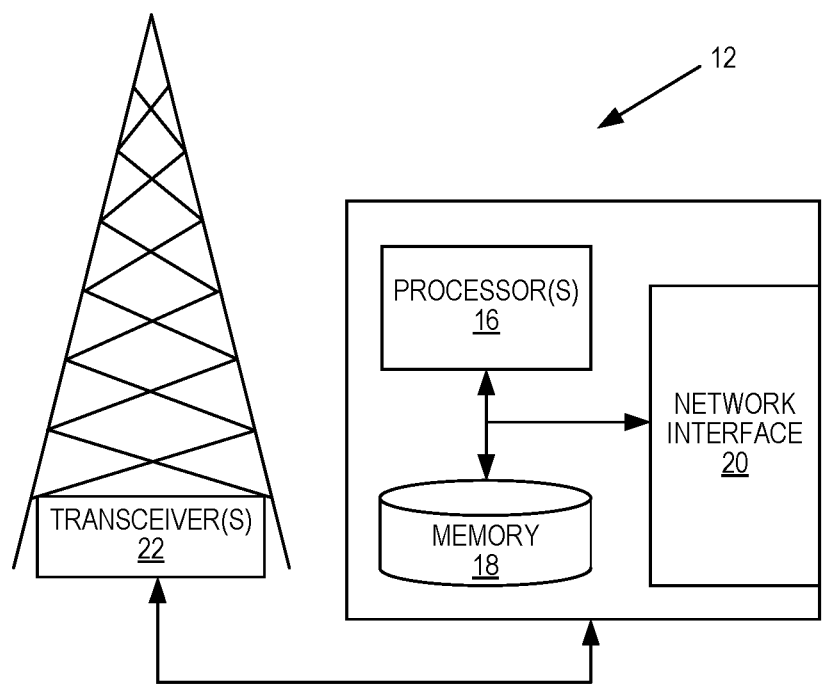
FIGS. 11 and 12 illustrate embodiments of the base station.

FIG. 11 is schematic diagram of the eNB 12 in accordance with some embodiments of the present disclosure. The eNB 12 includes a baseband unit that includes one or more processors 16 (e.g., one or more Central Processing Units (CPUs), one or more Application Specific Integrated Circuits (ASICs), one or more Field Programmable Gate Arrays (FPGAs), and/or the like), memory 18, and a network interface 20. In addition, the eNB 12 includes one or more radio units including one or more transceivers 22. The transceiver(s) 22 allows the eNB 12 to send and receive wireless signals. The processor(s) 16 can execute instructions stored in the memory 18 based on, e.g., signals received wirelessly via the transceiver(s) 22. In particular, in some embodiments, the functionality of the eNB 12 described herein is implemented in software that is, e.g., stored in the memory 18 and executed by the processor(s) 16. The network interface 20 allows the eNB 12 to interact with, e.g., a core network, such as sending and receiving signals from a wired link.

In some embodiments, a computer program including instructions which, when executed by at least one processor, causes at least one processor to carry out the functionality of the eNB 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 18).

Figure 12:
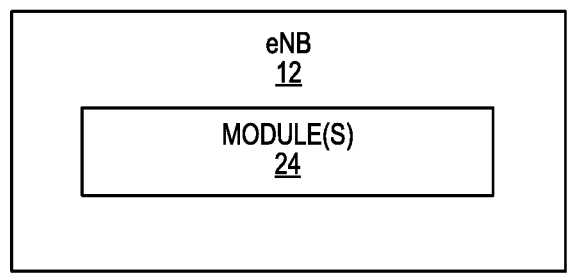

FIG. 12 illustrates the eNB 12 according to some other embodiments of the present disclosure. The eNB 12 includes one or more modules 24, each of which is implemented in software, that provide the functionality of the eNB 12 described herein. For example, in some embodiments, the module(s) 24 include an OOS detection module that detects the OOS state of the UE 14 and a connection release module that performs the connection release procedure described herein.

It should be noted that, as will be appreciated by one of skill in the art, some of the functionality of the eNB 12 may be virtualized and implemented "in the cloud." In other words, some of the functionality of the eNB 12 may be implemented as software that is executed by one or more processing nodes in a network, where each processing node includes one or more processors, memory, and a network interface (e.g., an Ethernet interface). For example, some of the functionality of the eNB 12 described herein such as, for example, those functions described above with respect to steps 100, 104, 106, and/or 108 may be implemented "in the cloud," where these virtualized components communicate with the baseband unit of the eNB 12 or, alternatively, communicate directly with the radio unit(s) or transceiver(s) 22 of the eNB 12 to wirelessly transmit wireless signals to the UE 14 and receive signals from the UE 14. As an example, lower layers of the protocol stack (e.g., L1 (i.e., the physical layer (PHY)) and some or all of L2) of the eNB 12 may be implemented in the radio unit(s) or transceiver(s) 22 of the eNB 12, whereas some higher layer(s) in the protocol stack (e.g., L3 and higher layers) may be virtualized and implemented "in the cloud." Note that some of L2 (e.g., the PDCP layer) may be implemented "in the cloud".

Figure 13:
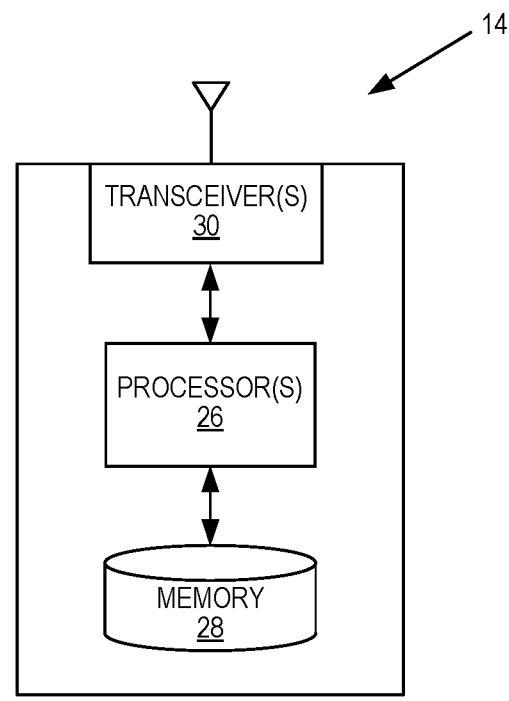
FIGS. 13 and 14 illustrate embodiments of the wireless device.

FIG. 13 is a schematic diagram of the UE 14 in accordance with some embodiments of the present disclosure. The UE 14 is configured to send and receive wireless signals. The UE 14 includes one or more processors 26 (e.g., one or more CPUs, one or more ASICs, one or more FPGAs, and/or the like), memory 28, one or more transceiver(s) 30 coupled to one or more antennas. The transceiver(s) 30 allows the UE 14 to send and receive wireless signals. The processor(s) 26 can execute instructions stored in the memory 28 based on, e.g., signals received wirelessly via the transceiver 30. In particular, in some embodiments, the functionality of the UE 14 described herein is implemented in software that is stored in the memory 28 and executed by the processor(s) 26.

In some embodiments, a computer program including instructions which, when executed by at least one processor, causes the at least one processor to carry out the functionality of the UE 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 28).

Figure 14:
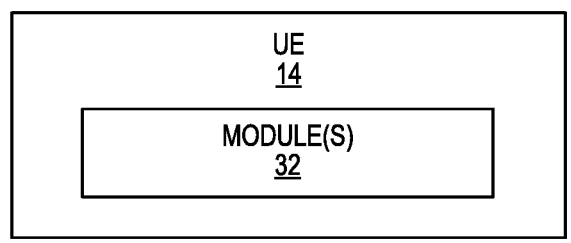

FIG. 14 illustrates the UE 14 according to some other embodiments of the present disclosure. The UE 14 includes one or more modules 32, each of which is implemented in software, that provide the functionality of the UE 14 described herein. For example, in some embodiments, the module(s) 32 include an OOS detection module that detects the OOS state of the UE 14 and a connection release module that performs the connection release procedure described herein.

Some exemplary, non-limiting embodiments of the present disclosure are described below.

Embodiment 1: A method of operation of a base station in a cellular communications network, comprising:
  sending a connection release message to a wireless device that is in an Out-of-Sync, OOS, state; and
  releasing a connection with the wireless device without receiving an acknowledgement from the wireless device.

Embodiment 2: The method of embodiment 1 further comprising re-transmitting the connection release message.

Embodiment 3: The method of embodiment 2 wherein re-transmitting the connection release message comprises re-transmitting the connection release message a configurable number of times.

Embodiment 4: The method of any of embodiments 1-3 further comprising, prior to sending the connection release message, making an agreement with the wireless device to activate unacknowledged connection release.

Embodiment 5: The method of embodiment 4 wherein the agreement is an implicit agreement to activate unacknowledged connection release.

Embodiment 6: The method of embodiment 5 wherein making the agreement with the wireless device to activate unacknowledged connection release comprises receiving capability information from the wireless device that indicates that the wireless device supports unacknowledged connection release.

Embodiment 7: The method of embodiment 4 wherein making the agreement comprises sending an indication to the wireless device to activate unacknowledged connection release.

Embodiment 8: The method of embodiment 7 wherein making the agreement further comprises receiving a response from the wireless device that indicates that the wireless device accepts activation of unacknowledged connection release.

Embodiment 9: The method of embodiment 8 wherein sending the indication to the wireless device to activate unacknowledged connection release comprises sending the indication to the wireless device to activate unacknowledged connection release via a Radio Resource Control, RRC, message, and receiving the response from the wireless device comprises receiving the response via an RRC message.

Embodiment 10: The method of embodiment 4 wherein making the agreement comprises sending, to the wireless device, an indication to activate unacknowledged connection release via a Medium Access Control, MAC, control element.

Embodiment 11: The method of embodiment 10 wherein making the agreement further comprises receiving, from the wireless device, a response that accepts activation of unacknowledged connection release via a MAC control element.

Embodiment 12: The method of embodiment 4 wherein making the agreement comprises receiving, from the wireless device, an indication to activate unacknowledged connection release via a Medium Access Control, MAC, control element.

Embodiment 13: The method of embodiment 12 wherein making the agreement further comprises sending, to the wireless device, a response that accepts activation of unacknowledged connection release via a MAC control element.

Embodiment 14: A base station adapted to operate according to the method of any of embodiments 1-13.

Embodiment 15: A base station in a cellular communications network, comprising:
  means for sending a connection release message to a wireless device that is in an Out-of-Sync, OOS, state; and
  means for releasing a connection with the wireless device without receiving an acknowledgement from the wireless device.

Embodiment 16: A base station in a cellular communications network, comprising one or more modules adapted to:
  send a connection release message to a wireless device that is in an Out-of-Sync, OOS, state; and
  release a connection with the wireless device without receiving an acknowledgement from the wireless device.

Embodiment 17: A method of operation of a wireless device in a cellular communications network, comprising:
  receiving a connection release message from a base station while the wireless device is in an Out-of-Sync, OOS, state; and
  releasing a connection with the base station without sending an acknowledgement to the base station.

Embodiment 18: The method of embodiment 17 further comprising, prior to receiving the connection release message, making an agreement with the base station to activate unacknowledged connection release.

Embodiment 19: The method of embodiment 18 wherein the agreement is an implicit agreement to activate unacknowledged connection release.

Embodiment 20: The method of embodiment 19 wherein making the agreement with the wireless device to activate unacknowledged connection release comprises sending capability information to the base station that indicates that the wireless device supports unacknowledged connection release.

Embodiment 21: The method of embodiment 18 wherein making the agreement comprises receiving an indication from the base station to activate unacknowledged connection release.

Embodiment 22: The method of embodiment 21 wherein making the agreement further comprises sending a response to the base station that indicates that the wireless device accepts activation of unacknowledged connection release.

Embodiment 23: The method of embodiment 22 wherein receiving the indication from the base station to activate unacknowledged connection release comprises receiving the indication from the base station to activate unacknowledged connection release via a Radio Resource Control, RRC, message, and sending the response to the base station comprises sending the response via an RRC message.

Embodiment 24: The method of embodiment 19 wherein making the agreement comprises receiving, from the base station, an indication to activate unacknowledged connection release via a Medium Access Control, MAC, control element.

Embodiment 25: The method of embodiment 24 wherein making the agreement further comprises sending, to the base station, a response that accepts activation of unacknowledged connection release via a MAC control element.

Embodiment 26: The method of embodiment 18 wherein making the agreement comprises sending, to the base station, an indication to activate unacknowledged connection release via a Medium Access Control, MAC, control element.

Embodiment 27: The method of embodiment 26 wherein making the agreement further comprises receiving, from the base station, a response that accepts activation of unacknowledged connection release via a MAC control element.

Embodiment 28: A wireless device adapted to operate according to the method of any of embodiments 17-27.

Embodiment 29: A wireless device enabled to operate in a cellular communications network, comprising:
 means for receiving a connection release message from a base station while the wireless device is in an Out-of-Sync, OOS, state; and
 means for releasing a connection with the base station without sending an acknowledgement to the base station.

Embodiment 30: A wireless device enabled to operate a cellular communications network, comprising one or more modules adapted to:
 receive a connection release message from a base station while the wireless device is in an Out-of-Sync, OOS, state; and
 release a connection with the base station without sending an acknowledgement to the base station.

The following acronyms are used throughout this disclosure.
 3GPP Third Generation Partnership Project
 ACK Acknowledgement
 AM Acknowledged Mode
 ASIC Application Specific Integrated Circuit
 CBRA Contention-Based Random Access
 CCE Control Channel Element
 CFRA Contention-Free Random Access
 CPU Central Processing Unit
 CR Contention Resolution
 C-RNTI Cell Radio Network Temporary Identifier
 eNB Enhanced or Evolved Node B
 EPDCCH Enhanced Physical Downlink Control Channel
 FPGA Field Programmable Gate Array
 HARQ Hybrid Automatic Repeat Request
 INS In-Sync
 LTE Long Term Evolution
 MAC Medium Access Control
 MCS Modulation and Coding Scheme
 NACK Negative Acknowledgement
 OOS Out-of-Sync
 PDCCH Physical Downlink Control Channel
 PDSCH Physical Downlink Shared Channel
 PHICH Physical Hybrid Automatic Repeat Request Indicator Channel
 PRACH Physical Random Access Channel
 PUCCH Physical Uplink Control Channel
 PUSCH Physical Uplink Shared Channel
 RACH Random Access Channel
 RAR Random Access Response
 RLC Radio Link Control
 RRC Radio Resource Control
 SR Scheduling Request
 SRS Sounding Reference Signal
 TAC Time Alignment Command
 TAT Time-Alignment-Timer
 TS Technical Specification
 UE User Equipment Those skilled in the art will recognize improvements and modifications to the embodiments of the present disclosure. All such improvements and modifications are considered within the scope of the concepts disclosed herein.

What is claimed is:

1. A method of operation of a base station in a cellular communications network, comprising:
 sending a connection release message to a wireless device that is in an Out-of-Sync, OOS, state relating to loss of uplink synchronization for the wireless device; and
 releasing a connection with the wireless device without receiving, from the wireless device, an acknowledgement of receipt of the connection release message.

2. The method of claim 1 wherein releasing the connection with the wireless device comprises releasing the connection with the wireless device without receiving, from the wireless device, a Hybrid Automatic Repeat Request, HARQ, acknowledgement and without receiving a Radio Link Control, RLC, acknowledgement.

3. The method of claim 1 further comprising re-transmitting the connection release message to the wireless device without waiting for the Hybrid Automatic Repeat Request, HARQ, acknowledgement.

4. The method of claim 3 wherein re-transmitting the connection release message comprises re-transmitting the connection release message a configurable number of times.

5. The method of claim 1 further comprising, prior to sending the connection release message, making an agreement with the wireless device to activate unacknowledged connection release.

6. The method of claim 5 wherein the agreement is an implicit agreement to activate unacknowledged connection release.

7. The method of claim 5 wherein making the agreement with the wireless device to activate unacknowledged connection release comprises:
 receiving capability information from the wireless device that indicates that the wireless device supports unacknowledged connection release; and
 making a decision to activate unacknowledged connection release for the wireless device based on the capability information.

8. The method of claim 5 wherein making the agreement comprises receiving an indication from the wireless device to activate unacknowledged connection release.

9. The method of claim 8 wherein making the agreement further comprises sending a response to the wireless device that indicates that the base station accepts activation of unacknowledged connection release.

10. The method of claim 9 wherein:
receiving the indication from the wireless device to activate unacknowledged connection release comprises receiving the indication from the wireless device to activate unacknowledged connection release via a Medium Access Control, MAC, control element; and
sending the response to the wireless device comprises sending the response via a MAC control element.

11. The method of claim 5 wherein making the agreement comprises sending, to the wireless device, an indication to activate unacknowledged connection release.

12. The method of claim 11 wherein making the agreement further comprises receiving, from the wireless device, a response that accepts activation of unacknowledged connection release.

13. The method of claim 12 wherein:
sending the indication comprises sending the indication to the wireless device via a Medium Access Control, MAC, control element; and
receiving the response comprises receiving the response from the wireless device via a MAC control element.

14. A base station for a cellular communications network, comprising:
at least one transceiver;
at least one processor; and
memory comprising instructions executable by the at least one processor whereby the base station is operable to:
send, via the at least one transceiver, a connection release message to a wireless device that is in an Out-of-Sync, OOS, state relating to loss of uplink synchronization for the wireless device; and
release a connection with the wireless device without receiving, from the wireless device, an acknowledgement of receipt of the connection release message.

15. A method of operation of a wireless device in a cellular communications network, comprising:
receiving a connection release message from a base station while the wireless device is in an Out-of-Sync, OOS, state relating to loss of uplink synchronization for the wireless device; and
releasing a connection with the base station without sending an acknowledgement to the base station.

16. The method of claim 15 wherein releasing the connection with the base station comprises releasing the connection with the base station without receiving, from the base station, a Hybrid Automatic Repeat Request, HARQ, acknowledgement and without receiving a Radio Link Control, RLC, acknowledgement.

17. The method of claim 15 further comprising, prior to receiving the connection release message, making an agreement with the base station to activate unacknowledged connection release.

18. The method of claim 17 wherein the agreement is an implicit agreement to activate unacknowledged connection release.

19. The method of claim 17 wherein making the agreement with the base station to activate unacknowledged connection release comprises:
sending capability information to the base station that indicates that the wireless device supports unacknowledged connection release; and
receiving an indication from the base station to activate unacknowledged connection release.

20. The method of claim 17 wherein making the agreement comprises sending an indication to the base station to activate unacknowledged connection release.

21. The method of claim 20 wherein making the agreement further comprises receiving a response from the base station that indicates that the base station accepts activation of unacknowledged connection release.

22. The method of claim 21 wherein:
sending the indication to the base station to activate unacknowledged connection release comprises sending the indication to the base station to activate unacknowledged connection release via a Medium Access Control, MAC, control element; and
receiving the response from the base station comprises receiving the response via a MAC control element.

23. The method of claim 17 wherein making the agreement comprises receiving, from the base station, an indication to activate unacknowledged connection release.

24. The method of claim 23 wherein making the agreement further comprises sending, to the base station, a response that accepts activation of unacknowledged connection release.

25. The method of claim 24 wherein:
receiving the indication comprises receiving the indication from the base station via a Medium Access Control, MAC, control element; and
sending the response comprises sending the response to the base station via a MAC control element.

26. A wireless device for a cellular communications network, comprising:
at least one transceiver;
at least one processor; and
memory comprising instructions executable by the at least one processor whereby the wireless device is operable to:
receive a connection release message from a base station while the wireless device is in an Out-of-Sync, OOS, state relating to loss of uplink synchronization for the wireless device; and
release a connection with the base station without sending an acknowledgement to the base station.

* * * * *